US012574795B2

(12) United States Patent　　　　(10) Patent No.: US 12,574,795 B2
Esswie et al.　　　　　　　　　　　(45) Date of Patent: Mar. 10, 2026

(54) ENHANCED PROCEDURES FOR TRANSMISSION OF TIMING INFORMATION IN TELECOMMUNICATION SYSTEMS

(71) Applicant: Nokia Technologies Oy, Espoo (FI)

(72) Inventors: Ali Esswie, Aalborg (DK); Klaus Ingemann Pedersen, Aalborg (DK); Troels Emil Kolding, Klarup (DK); Ping-Heng Kuo, London (GB)

(73) Assignee: Nokia Technologies, Espoo (FI)

( * ) Notice: Subject to any disclaimer, the term of this patent is extended or adjusted under 35 U.S.C. 154(b) by 568 days.

(21) Appl. No.: 18/010,281

(22) PCT Filed: Jun. 16, 2020

(86) PCT No.: PCT/EP2020/066594

§ 371 (c)(1),
(2) Date: Dec. 14, 2022

(87) PCT Pub. No.: WO2021/254599

PCT Pub. Date: Dec. 23, 2021

(65) Prior Publication Data

US 2023/0239730 A1　　　Jul. 27, 2023

(51) Int. Cl.
*H04W 72/04*　　　(2023.01)
*H04W 28/02*　　　(2009.01)
*H04W 24/10*　　　(2009.01)

(52) U.S. Cl.
CPC ........ *H04W 28/0278* (2013.01); *H04W 24/10* (2013.01)

(58) Field of Classification Search
CPC . H04W 28/0278; H04W 24/10; H04W 72/21; H04W 56/00
See application file for complete search history.

(56) References Cited

U.S. PATENT DOCUMENTS

| 9,369,904 | B2 * | 6/2016 | Wen | ...................... | H04L 5/0053 |
| 12,108,278 | B2 * | 10/2024 | Zheng | ................... | H04W 72/21 |
| 12,323,344 | B2 * | 6/2025 | Khoshnevisan | ...... | H04W 72/29 |

(Continued)

FOREIGN PATENT DOCUMENTS

| CN | 108540997 B | 2/2020 |
| EP | 3048847 A1 | 7/2016 |

(Continued)

OTHER PUBLICATIONS

Ericsson, "Impact on BSR for feLAA," 3GPP TSG-RAN WG2 #101, R2-1803506, Anthens, Greece, Feb. 26-Mar. 2, 2018.

*Primary Examiner* — Mahbubul Bar Chowdhury
(74) *Attorney, Agent, or Firm* — Lippes Mathias LLP

(57)　　　　ABSTRACT
According to one example embodiment, a method may include receiving, by a user equipment, at least one buffer status report configuration from a network entity. The method may further include measuring, by the user equipment, at least one uplink packet arrival time according to the received at least one buffer status report configuration. The method may further include selecting, by the user equipment, at least one buffer status report format. The method may further include transmitting, by the user equipment, at least one uplink time-stamped buffer status report to the network entity according to the selected at least one buffer status report format.

14 Claims, 18 Drawing Sheets

(56)  References Cited

U.S. PATENT DOCUMENTS

| | | | | |
|---|---|---|---|---|
| 2009/0080380 | A1* | 3/2009 | Chun | H04W 28/06 |
| | | | | 370/329 |
| 2014/0022933 | A1* | 1/2014 | Yi | H04L 43/0888 |
| | | | | 370/253 |
| 2015/0098322 | A1* | 4/2015 | Chen | H04W 28/0864 |
| | | | | 370/230 |
| 2019/0053260 | A1 | 2/2019 | Shaheen | |
| 2021/0274530 | A1* | 9/2021 | Sebire | H04W 28/0278 |
| 2022/0095332 | A1* | 3/2022 | Li | H04W 72/1268 |
| 2023/0239956 | A1* | 7/2023 | Miao | H04W 76/27 |
| | | | | 370/329 |

FOREIGN PATENT DOCUMENTS

| | | | |
|---|---|---|---|
| EP | 3200505 A1 | 8/2017 | |
| WO | WO 2018/010667 A1 | 1/2018 | |
| WO | WO-2019154223 A1 * | 8/2019 | H04W 72/23 |

* cited by examiner

FIG. 2

Short BSR

| LCG ID | Buffer Size | Oct 1 |
|---|---|---|

Long BSR

| $LCG_7$ | $LCG_6$ | $LCG_5$ | $LCG_4$ | $LCG_3$ | $LCG_2$ | $LCG_1$ | $LCG_0$ | Oct 1 |
|---|---|---|---|---|---|---|---|---|
| Buffer Size 1 | | | | | | | | Oct 2 |
| Buffer Size 2 | | | | | | | | Oct 3 |

...

| Buffer Size m | Oct m+1 |
|---|---|

FIG. 3

```
MAC-CellGroupConfig ::=      SEQUENCE {
drx-Config                   SetupRelease { DRX-Config } OPTIONAL, -- Need M
schedulingRequestConfig      SchedulingRequestConfig    OPTIONAL, -- Need M
bsr-Config                   BSR-Config OPTIONAL, -- Need M
tag-Config                   TAG-Config OPTIONAL, -- Need M
phr-Config                   SetupRelease { PHR-Config } OPTIONAL, -- Need M
skipUplinkTxDynamic          BOOLEAN,

...,

[[
csi-Mask-v1530               BOOLEAN OPTIONAL, -- Need M
dataInactivityTimer-v1530    SetupRelease { DataInactivityTimer } OPTIONAL --NEED M
PCellOnly
]]
}

BSR-Config ::=      SEQUENCE {
periodicBSR-Timer          ENUMERATED { sf1, sf5, sf10, sf16, sf20, sf32, sf40, sf64, sf80, sf128, sf160, sf320, sf640,
                                        sf1280, sf2560, infinity},
retxBSR-Timer              ENUMERATED { sf10, sf20, sf40, sf80, sf160, sf320, sf640, sf1280, sf2560, sf5120, sf10240,
                                        spare5, spare4,spare3, spare2, spare1},
logicalChannelSR-DelayTimer  ENUMERATED  { sf20, sf40, sf64, sf128, sf512, sf1024, sf2560, spare1} OPTIONAL  --
                                        Need R
...
}
```

FIG. 9

| Short eBSR | | LCG ID | Buffer size | Time stamp 0 | Age 0 |
|---|---|---|---|---|---|

| Long eBSR | LCG 0 | LCG 1 | LCG 2 | LCG 3 | LCG 4 | ... | ... |
|---|---|---|---|---|---|---|---|
| | Buffer size 0 | | | | | Time stamp 0 | Age 0 |
| | Buffer size 1 | | | | | Time stamp 1 | Age 1 |
| | Buffer size 2 | | | | | Time stamp 2 | Age 2 |
| | Buffer size 3 | | | | | Time stamp 3 | Age 3 |
| | Buffer size 4 | | | | | Time stamp 4 | Age 4 |

FIG. 11

| Short eBSR | | LCG ID | Buffer size | Age 0 |
|---|---|---|---|---|

| | LCG 0 | LCG 1 | LCG 2 | LCG 3 | LCG 4 | ... |
|---|---|---|---|---|---|---|
| Long eBSR | Buffer size 0 | | | | | Age 0 |
| | Buffer size 1 | | | | | Age 1 |
| | Buffer size 2 | | | | | Age 2 |
| | Buffer size 3 | | | | | Age 3 |
| | Buffer size 4 | | | | | Age 4 |

FIG. 12

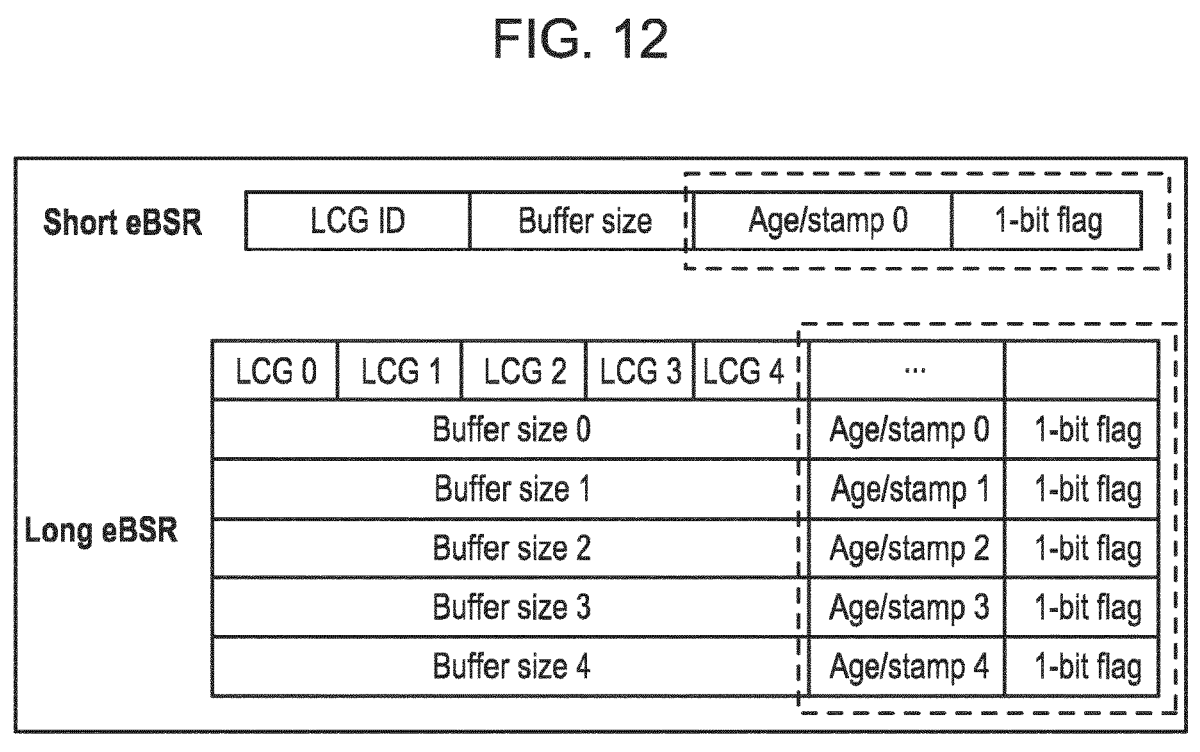

| | | | | | | |
|---|---|---|---|---|---|---|
| Short eBSR | LCG ID | Buffer size | Age/stamp 0 | 1-bit flag | | |

| | | | | | | | |
|---|---|---|---|---|---|---|---|
| | LCG 0 | LCG 1 | LCG 2 | LCG 3 | LCG 4 | ... | |
| | Buffer size 0 | | | | | Age/stamp 0 | 1-bit flag |
| | Buffer size 1 | | | | | Age/stamp 1 | 1-bit flag |
| Long eBSR | Buffer size 2 | | | | | Age/stamp 2 | 1-bit flag |
| | Buffer size 3 | | | | | Age/stamp 3 | 1-bit flag |
| | Buffer size 4 | | | | | Age/stamp 4 | 1-bit flag |

FIG. 13

| Index | UL time stamp value (symbols) |
|---|---|
| 0 | Time = 0 |
| 2 | $0 < \text{Time} \leq 1$ |
| 3 | $1 < \text{Time} \leq 2$ |
| 4 | $2 < \text{Time} \leq 3$ |
| 5 | $3 < \text{Time} \leq 4$ |
| | |
| 100 | $80 < \text{Time} \leq 85$ |
| 101 | $85 < \text{Time} \leq 90$ |
| | |
| 253 | $260 < \text{Time} \leq 270$ |
| 254 | $270 < \text{Time} \leq 280$ |

FIG. 15

BSR-Config::= SEQUENCE {

| | |
|---|---|
| periodicBSR-Timer | ENUMERATED {sf1, sf5, sf10, sf16, sf20, sf32, sf40, sf64, sf80, sf128, sf160, sf320, sf640, sf1280, sf2560, infinity}, |
| retxBSR-Timer | ENUMERATED {sf10, sf20, sf40, sf80, sf160, sf320, sf640, sf1280, sf2560,sf5120, sf10240, spare5, spare4, spare3, spare2, spare1}, |
| logicalChannelSR-DelayTimer | ENUMERATED {sf20, sf40, sf64, sf128, sf512, sf1024, sf2560, spare1} OPTIONAL, -- Need R |
| TimeStamped-BSR | BOOLEAN (0, 1) |
| BSRTimeStamp-Resolution | ENUMERATED {SYMBOL, SLOT, $N$ SLOT, SUBFRAME, ...} |
| TimeStampedBSR-ForceWithULTx | BOOLEAN (0, 1) |
| ExtendedTimeStamped-BSR | BOOLEAN (0, 1) |
| BSRTimeStamped-EnableDynStamp | BOOLEAN (0, 1) |
| BSRTimeStamped-ForceAgeInfo | BOOLEAN (0, 1) |

1601 — perform standard RRC signaling with NE

1603 — receive RRC signaling for eBSR configuration and reporting

1605 — receive UL packets

1607 — record UL packet arrival time to configured timing reference based on configured resolution 1609 — select eBSR format as configured from NE 1611 — trigger eBSR reporting based on triggering conditions 1613 — transmit UL time-stamped eBSR report

ENHANCED PROCEDURES FOR TRANSMISSION OF TIMING INFORMATION IN TELECOMMUNICATION SYSTEMS

CROSS REFERENCE TO RELATED APPLICATION

This patent application is a U.S. National Stage application of International Patent Application Number PCT/EP2020/066594 filed Jun. 16, 2020, which is hereby incorporated by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for providing a flexible technique of dynamically transferring uplink timing information from user equipment to base stations with minimal signalling overhead.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, at least one buffer status report configuration from a network entity. The method may further include measuring, by the user equipment, at least one uplink packet arrival time according to the received buffer status report configuration. The method may further include selecting, by the user equipment, at least one buffer status report format. The method may further include transmitting, by the user equipment, at least one uplink time-stamped buffer status report to the network entity according to the selected at least one buffer status report format.

In accordance with certain example embodiments, an apparatus may include means for receiving at least one buffer status report configuration from a network entity. The apparatus may further include means for measuring at least one uplink packet arrival time according to the received buffer status report configuration. The apparatus may further include means for selecting at least one buffer status report format. The apparatus may further include means for transmitting at least one uplink time-stamped buffer status report to the network entity according to the selected at least one buffer status report format.

In accordance with various example embodiments, an apparatus may include at least one processor and at least one memory including computer program code. The at least one memory and the computer program code may be configured to, with the at least one processor, cause the apparatus to at least receive at least one buffer status report configuration from a network entity. The at least one memory and the computer program code may be further configured to, with the at least one processor, cause the apparatus to at least measure at least one uplink packet arrival time according to the received at least one buffer status report configuration. The at least one memory and the computer program code may be further configured to, with the at least one processor, cause the apparatus to at least select at least one buffer status report format. The at least one memory and the computer program code may be further configured to, with the at least one processor, cause the apparatus to at least transmit at least one uplink time-stamped buffer status report to the network entity according to the selected at least one buffer status report format.

In accordance with some example embodiments, a non-transitory computer readable medium may be encoded with instructions that may, when executed in hardware, perform a method. The method may include receiving at least one buffer status report configuration from a network entity. The method may further include measuring at least one uplink packet arrival time according to the received at least one buffer status report configuration. The method may further include selecting at least one buffer status report format. The method may further include transmitting at least one uplink time-stamped buffer status report to the network entity according to the selected at least one buffer status report format.

In accordance with certain example embodiments, a computer program product may perform a method. The method may include receiving at least one buffer status report configuration from a network entity. The method may further include measuring at least one uplink packet arrival time according to the received at least one buffer status report configuration. The method may further include selecting at least one buffer status report format. The method may further include transmitting at least one uplink time-stamped buffer status report to the network entity according to the selected at least one buffer status report format.

In accordance with various example embodiments, an apparatus may include circuitry configured to receive at least one buffer status report configuration from a network entity. The circuitry may further be configured to measure at least one uplink packet arrival time according to the received at least least one buffer status report configuration. The circuitry may further be configured to select at least one buffer status report format. The circuitry may further be configured to transmit at least one uplink time-stamped buffer status report to the network entity according to the selected at least one buffer status report format.

In accordance with some example embodiments, a method may include communicating, by a network entity, with at least one user equipment via radio resource control signaling. The method may further include transmitting, by the network entity, at least one buffer status report configuration to the at least one user equipment. The method may further include receiving, by the network entity, at least one uplink time-stamped buffer status report from the at least one user equipment.

In accordance with certain example embodiments, an apparatus may include means for communicating with at least one user equipment via radio resource control signaling. The apparatus may further include means for transmitting at least one buffer status report configuration to the at least one user equipment. The apparatus may further include means for receiving at least one uplink time-stamped buffer status report from the at least one user equipment.

In accordance with various example embodiments, an apparatus may include at least one processor and at least one memory including computer program code. The at least one memory and the computer program code may be configured to, with the at least one processor, cause the apparatus to at least communicate with at least one user equipment via radio resource control signaling. The at least one memory and the computer program code may be further configured to, with the at least one processor, cause the apparatus to at least transmit at least one buffer status report configuration to the at least one user equipment. The at least one memory and the computer program code may be further configured to, with the at least one processor, cause the apparatus to at least receive at least one uplink time-stamped buffer status report from the at least one user equipment.

In accordance with some example embodiments, a non-transitory computer readable medium may be encoded with instructions that may, when executed in hardware, perform a method. The method may include communicating with at least one user equipment via radio resource control signaling. The method may further include transmitting at least one buffer status report configuration to the at least one user equipment. The method may further include receiving at least one uplink time-stamped buffer status report from the at least one user equipment.

In accordance with certain example embodiments, a computer program product may perform a method. The method may include communicating with at least one user equipment via radio resource control signaling. The method may further include transmitting at least one buffer status report configuration to the at least one user equipment. The method may further include receiving at least one uplink time-stamped buffer status report from the at least one user equipment.

In accordance with various example embodiments, an apparatus may include circuitry configured to communicate with at least one user equipment via radio resource control signaling. The circuitry may further be configured to transmit at least one buffer status report configuration to the at least one user equipment. The circuitry may further be configured to receive at least one uplink time-stamped buffer status report from the at least one user equipment.

BRIEF DESCRIPTION OF THE DRAWINGS

For proper understanding of example embodiments, reference should be made to the accompanying drawings, wherein:

FIG. 2 illustrates several examples of standard buffer status report formats.

FIG. 3 provides an example of a buffer status report configuration using RRCReconfiguration signalling.

FIG. 9 illustrates an example of an extended uplink time-stamped buffer status report format including uplink age information according to various example embodiments.

FIG. 11 illustrates an example of an extended buffer status report format including uplink age information according to some example embodiments.

FIG. 12 illustrates an example of dynamic buffer status report format selection by a user equipment according to various example embodiments.

FIG. 13 illustrates an example of overhead compression using predefined non-uniform tables according to some example embodiments.

FIG. 15 illustrates an example of a radio resource control BSR-Config object with information elements according to certain example embodiments.

DETAILED DESCRIPTION

Figure 1:
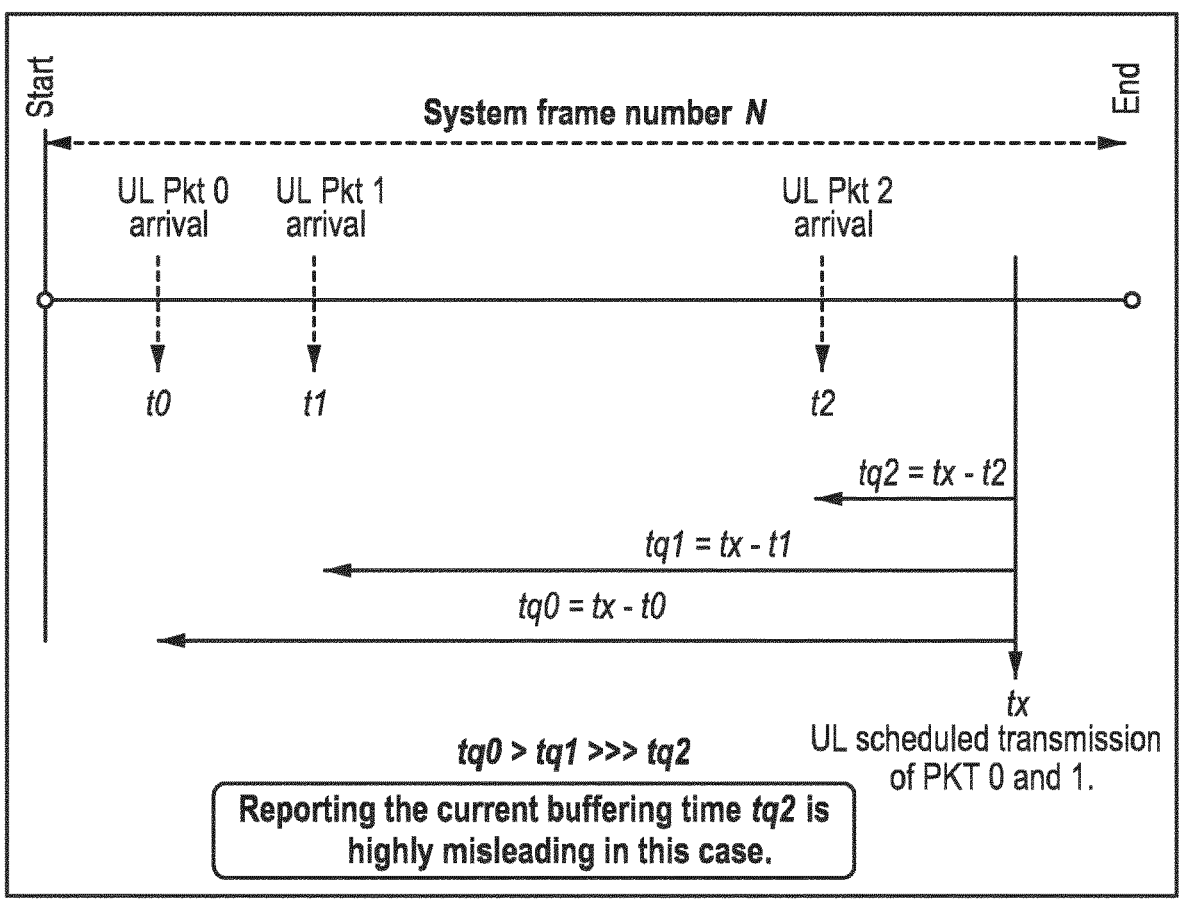
FIG. 1 demonstrates an example of a user equipment receiving three uplink packets without providing actual uplink timing performance of the user equipment.

Release (Rel)-16 of the 5G wireless communication network is expected to continue development of 3GPP technology by providing ultra-reliable and low-latency communication (URLLC) services through a variety of system design enhancements. Such URLLC services may be applied to a diverse range of applications, such as driverless vehicles, tactile internet, and wireless industrial controls. To support such applications, URLLC utilizes small-payload and intermittently-transmitted data packets to satisfy stringent radio latency and reliability requirements. For example, URLLC latency may have a requirement of 1 ms with 99.999% success probability. Along with Rel-16 developments, advances in time-sensitive communications (TSC) continue to support industrial applications, with 5G as the preferred wireless technology standard. Similar to URLLC, time-sensitive networking (TSN) also utilizes small-payload and intermittently-transmitted data packets, but with generally more stringent radio latency and reliability requirements compared to URLLC, frequently in μs. Thus, achieving the tighter regulations of TSC necessitates more efficient and real-time quality of service (QoS) monitoring by network entities, such as base stations (BS).

For example, for downlink (DL) traffic, network entities (NE), such as base stations, may be configured with DL packet arrival timing information, allowing them to utilize efficient, latency-aware scheduling. However, for uplink (UL) traffic, no efficient procedure exists for flexibly transferring UL packet arrival timing information from user equipment (UE) to serving NEs. In particular, configuring NEs with UL packet arrival timing information would require additional hardware at the UE, as well as significant additional radio signalling overhead.

These challenges become particularly evident with URLLC, where incoming UL packets are designed to arrive intermittently at the service data adaptation protocol (SDAP) layer of the UE, thereby complicating tracking of real-time UL QoS tracking. With respect to TSC for industrial applications, packet arrivals are periodic and deterministic in manner, providing the NE with extended UL packet arrival timing information. When the 5G TSC is integrated with, for example, an Institute of Electrical and Electronics Engineers (IEEE) TSN, the 5G TSC possesses precise uplink traffic flow information in advance. However, this technique is effective in just a small subset of applications, and requires a UE-specific modem containing a hardware-accelerated device side-TSN translator (DS-TT), resulting in limited applicability as a solution in comparison to 5G URLLC applications.

As explained above, in order for a NE to provide intermittent uplink traffic according to strict QoS requirements, the NE should timely allocate the required transmission resources for any UE it serves. However, this just becomes feasible with a procedure for the network to obtain UE-specific UL packet arrival timing information, integrating 5G into a centrally-managed, TSN-factory Ethernet, where UL traffic flow is strictly deterministic.

Current techniques are ineffective in transferring UL packet arrival timing information from UEs to serving NEs. For example, some techniques assume that UEs report absolute buffering delays of UL packets to their serving NEs, requiring additional UE hardware for real-time tracking and significant signalling overhead, as explained. In addition, in recent applications of 5G NR, such as URLLC, the one-time reporting of UL buffering time may differ significantly from the actual UL timing performance. For example, FIG. 1 illustrates a UE receiving three UL packets at t0, t1, and t2, where t2>t1>t0. The next scheduled UL transmission to the UE occurs at tx, where the grant is only sufficient to transmit packets 0 and 1, respectively, while packet 2 remains buffered until the next UL grant. Thus, reporting the current buffering time $tq2=tx-t2$ misrepresents the actual UL timing performance of the UE since tq2 includes a slight buffering delay since packet 2 arrived prior to the UL transmission. As a result, the timing of transmitted packets tq0 and tq1 would provide more accurate UL timing performance information.

Since UL packets transmitted by the NE lack explicit timing and latency information, LTE and NR both provide techniques for UEs to report information to assist NEs in optimizing scheduling. For example, NR buffer status report (BSR) procedures include two BSR formats: short BSR and long BSR. As illustrated in FIG. 2, the short BSR format allows UEs to report a buffer size of a single logical channel group (LCG) identifier (ID), while the long BSR format allows multiple buffer sizes of multiple active LCG IDs. Implicit in the buffer size information is an index value, ranging from 0 to 254 and representing a range of bytes in the respective buffer ID. For example, a buffer index of two would denote a buffer size of less than eleven bytes. The UE determines the BSR format based on whether there are packets from a single (i.e., short BSR) or a plurality (i.e., long BSR) of active LCGs.

A variety of triggering conditions may control the timing of BSR transmission. First, with regular BSR, a UE may trigger a short/long BSR report when new UL data arrives at its buffer and/or higher-priority UL traffic (e.g., traffic transmitted using previous BSRs) has arrived. In addition, periodic BSR reporting may be used during a running session, where buffer size and/or LCG may quickly change, and a UE periodically triggers BSRs to update the serving NE of its buffer status. Such BSR reporting periodicity may be configured by the serving NE via high layer RRC signalling. Finally, under padding BSR, a UE may trigger a BSR index of zero, as well as zero-padded data, for circumstances when the UE has received a UL grant larger than its buffer size and/or has no further data to transmit. Certain medium access control (MAC) protocol specifications may configure the BSR according to the higher-layer RRCReconfiguration from the NE, by means of MAC-CellGroupConfig and BSR-Config, as illustrated in FIG. 3.

Providing the serving NE with UL timing information in LTE mobile broadband (MBB) use cases, specifically absolute packet timing information, can improve performance, such as where the network receives absolute packet timing information and UL buffer status reports. Furthermore, some previous techniques propose coupling more accurate BSR formats with adaptive triggering conditions, optimizing the BSR size index by compensating for the difference between its actual value (i.e., buffer size) during transmission and its expected value during scheduling. Proposals have also been made to modify BSR transmission through improved data handling and prioritization within the BSR where a certain buffer status for a pre-configured business service/application is independently reported, thereby satisfying application requirements while simultaneously reducing BSR reporting overhead. Finally, different timers and processing procedures for the BSR re-transmissions have been suggested to accelerate BSR control.

Certain example embodiments described herein may have various benefits and/or advantages to overcome the disadvantages described above. For example, certain example embodiments may provide a flexible technique of dynamically transferring UL timing information from UEs to NEs with minimal signalling overhead. This may be particularly advantageous for intermittent URLLC deployments where UL timing information does not necessarily represent the UL packet buffering delay, and instead provide a more reliable procedure for real-time UL QoS monitoring. Finally, NEs may perform more efficient UL latency-aware resource allocations, UL QoS tracking, etc.

Furthermore, certain example embodiments discussed herein may efficiently convey relative UL timing information to a NE with different options for the UE to record the timing of received data, as well as how to efficiently signal received data to the network. For example, a dynamic and computationally-feasible procedure may enable UEs to signal the UL timing information for each of their corresponding logical channel flows, enabling the network to learn the UL traffic timing patterns, such as via machine learning capabilities, and accordingly, schedule and/or configure resource allocations for its UEs to comply with latency constraints. Thus, certain example embodiments discussed below are directed to improvements in computer-related technology.

Figure 4:
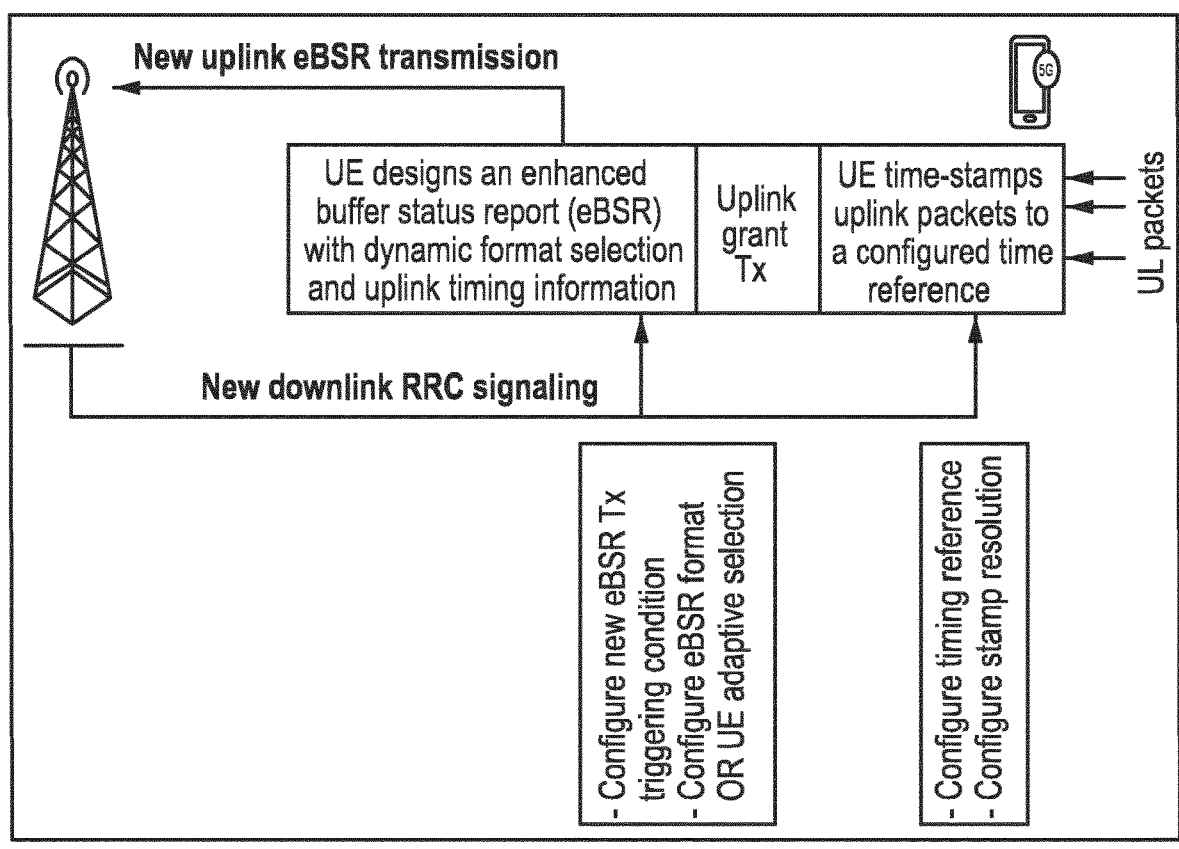
FIG. 4 illustrates a technique using an enhanced buffer status report generation and reporting according to some example embodiments.
Figure 5:
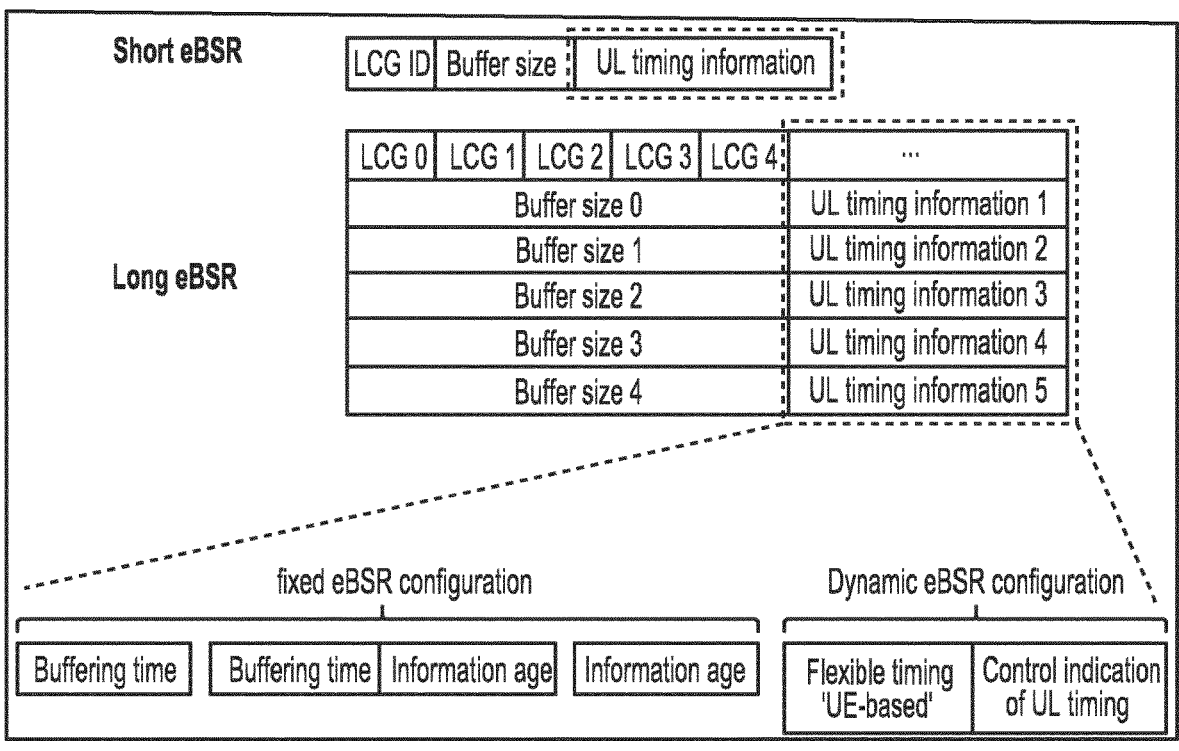
FIG. 5 illustrates an example of a buffer status report format with dynamic uplink timing information according to various example embodiments.

In some example embodiments, an enhanced BSR (eBSR) procedure may include a flexible format design, configuration, and reporting. As illustrated in FIG. 4, the NE may configure the UE with eBSR parameters using DL RRC signalling. UL packets received at the UE would be time stamped according to a configured time reference and timing resolution. When a UL grant becomes available, the UE dynamically creates the respective eBSR formatted in accordance with the received eBSR parameters, including configured UL timing information, such as that shown in FIG. 5. The eBSR format could be explicitly configured from the NE through high-layer RRC signalling, or even dynamically determined by the UE using predefined rules. The triggering conditions could be defined and configured by the NE. Finally, overhead compression techniques may further minimize radio signalling overhead.

Figure 6:
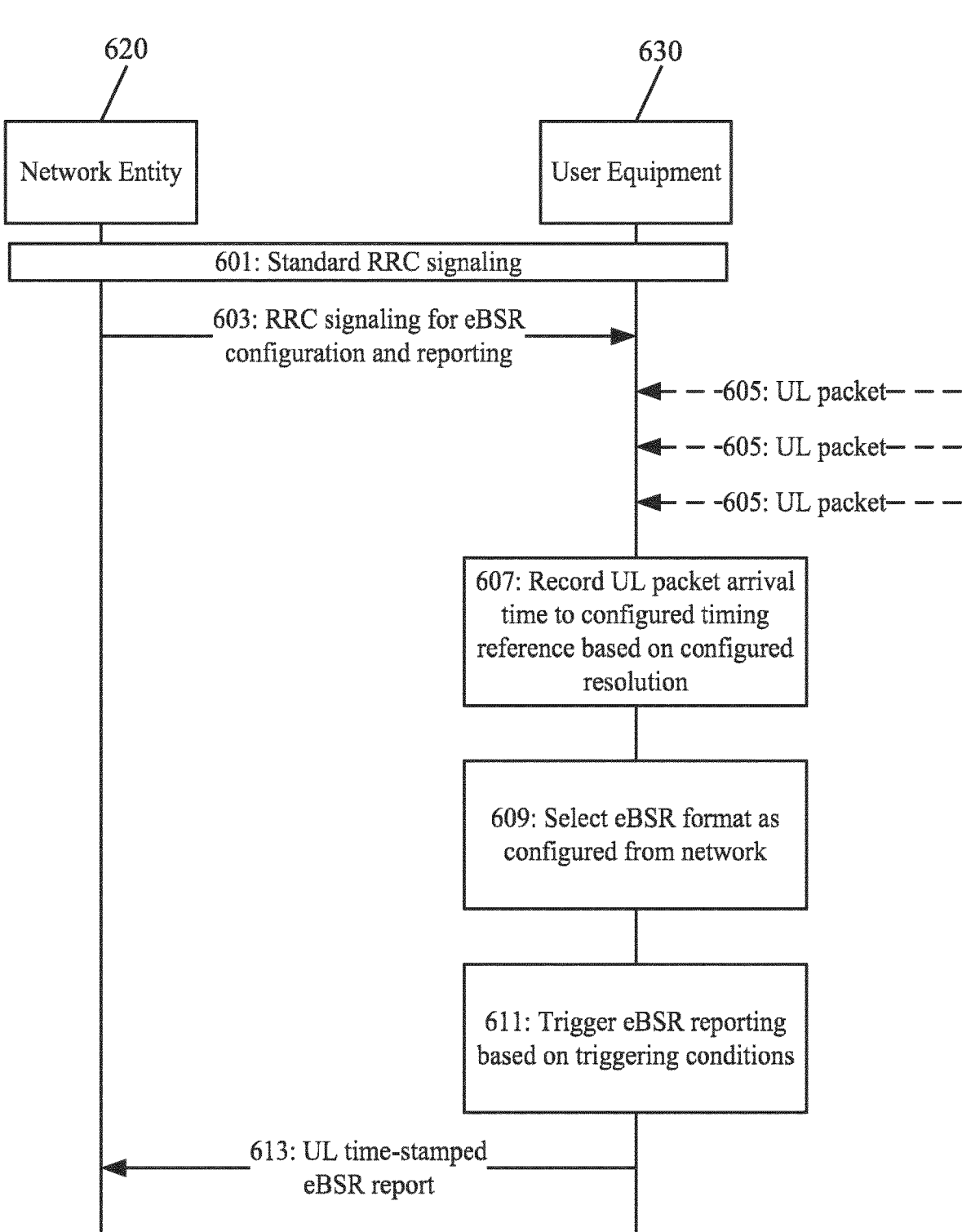
FIG. 6 illustrates an example of a signaling diagram according to certain example embodiments.
Figure 17:
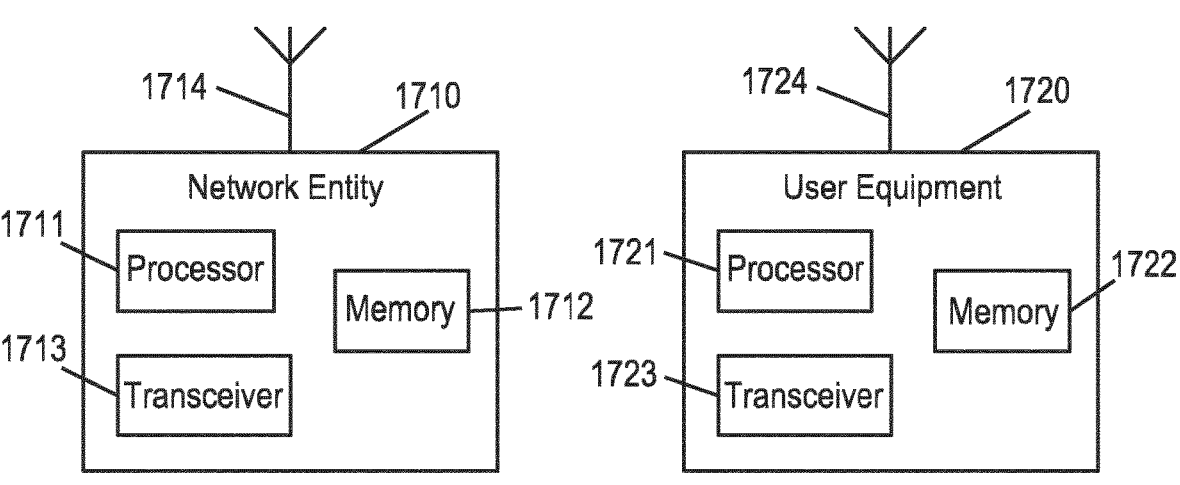
FIG. 17 illustrates an example of various network devices according to some example embodiments.

FIG. 6 illustrates an example of a signaling diagram depicting a UE signaling UL timing information for each of their corresponding logical channel flows. NE 620 and UE 630 may be similar to NE 1710 and UE 1720, as illustrated in FIG. 17, according to certain example embodiments. At 601, NE 620 and UE 630 may be communicating via standard RRC signaling. At 603, NE 620 may transmit to UE 630 RRC signaling associated with eBSR configurations and/or eBSR reporting. In certain example embodiments, eBSR configurations may include UL timing information, such as UL timing references and UL timing resolutions, eBSR format selections, and/or eBSR triggering conditions.

For example, the eBSR configurations could include configurations for UE 630 to report absolute UL time. For UL packets that will be discussed later at 605, absolute UL time configurations may be configured to cause UE 630 to report the absolute time of corresponding packet arrival times per LCG buffer as the UL time stamp. This absolute time indication could denote the exact clock time that the UL packet arrived.

In some example embodiments, the eBSR configurations may trigger UE 630 to report the arrival time of UL packets relative to a SFN. Using the configuration illustrated in FIG. 7, the UL time resolution configured by NE 620 may be a symbol duration relative to SFN boundaries. This UL time relative to SFN may be configured to cause UE 630 to embed a number of symbols when reporting the eBSR format, calculated from the start of the current SFN, over which the corresponding UL packet has been in the LCG buffer.

Figure 7:
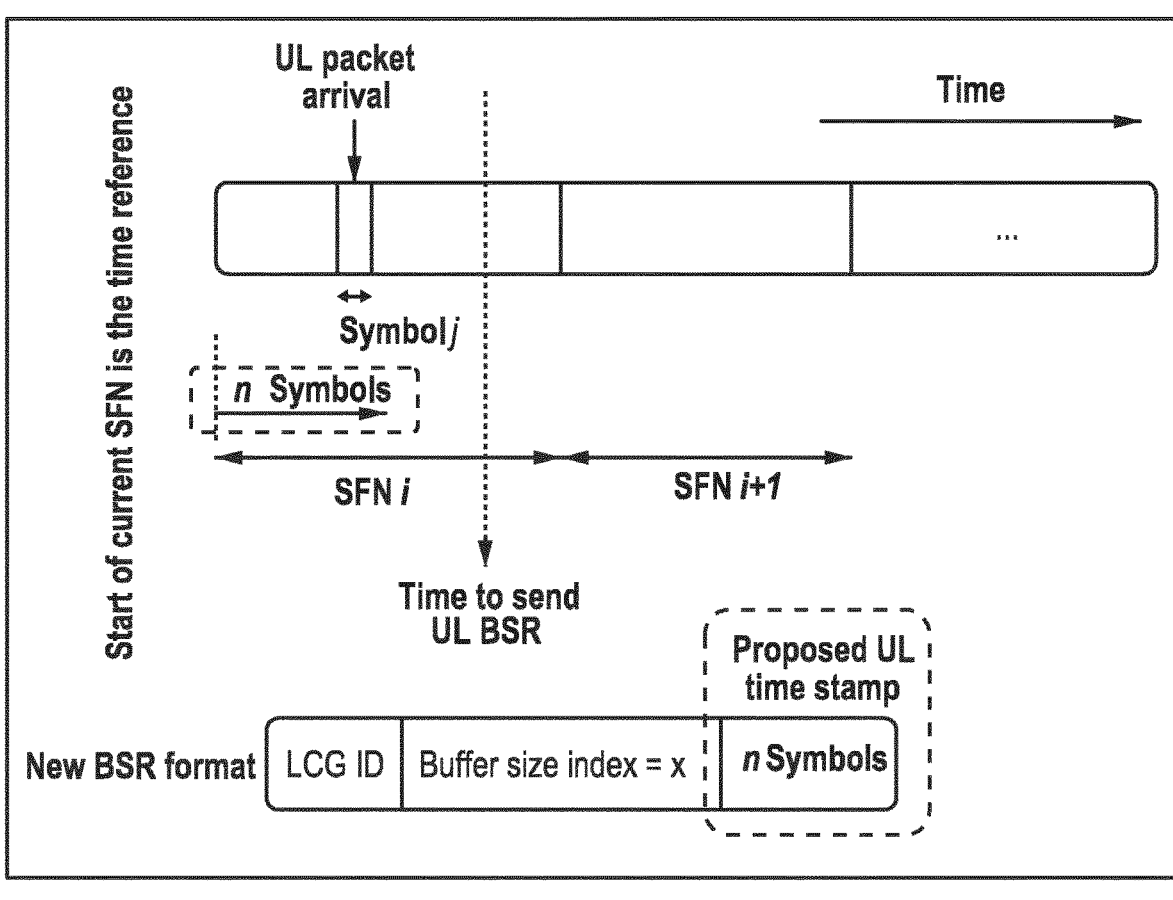
FIG. 7 illustrates an example of an enhanced buffer status report with system frame number as the time reference point according to certain example embodiments.
Figure 8:
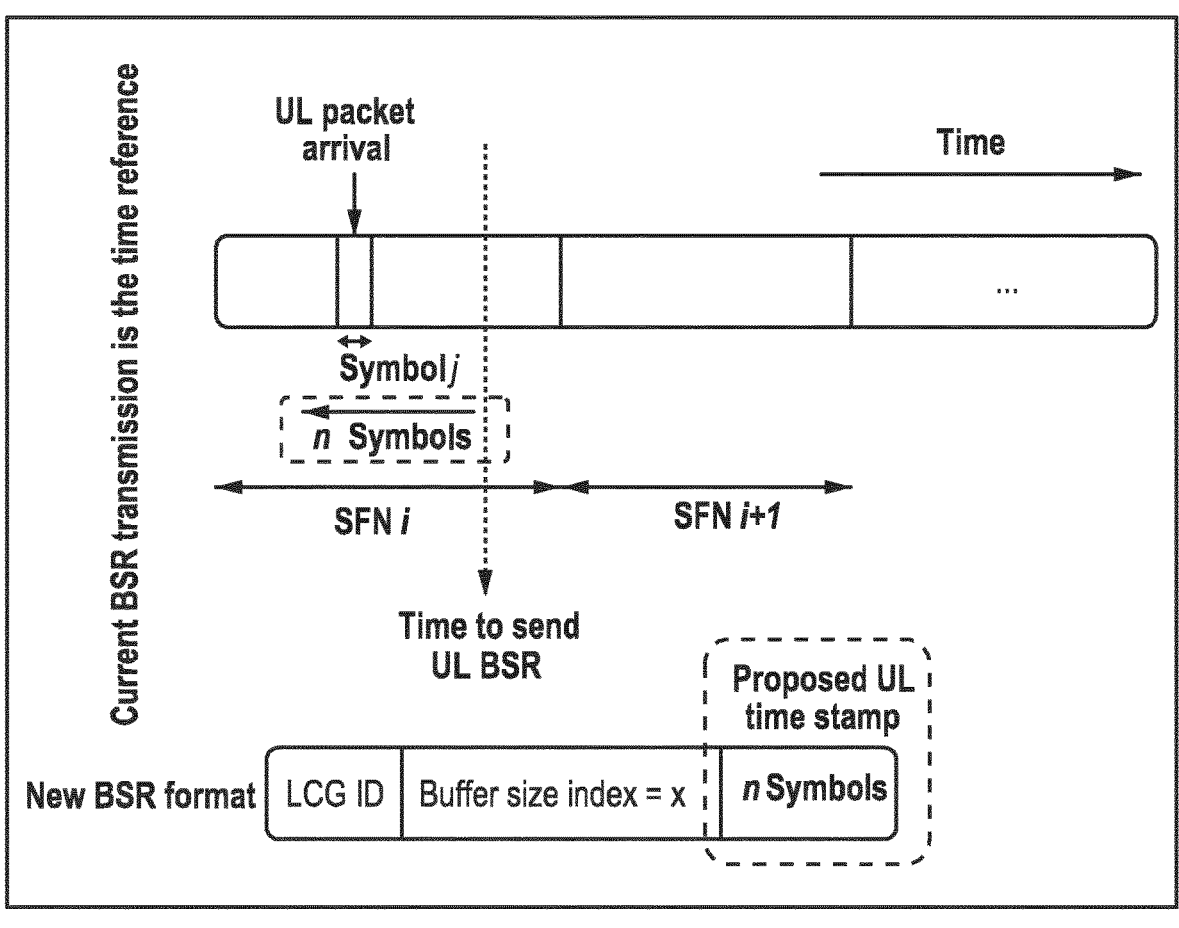
FIG. 8 illustrates an example of an enhanced buffer status report with buffer status report transmissions as the time reference point according to some example embodiments.

In various example embodiments, the eBSR configurations may cause UE 630 to report arrival time of UL packets relative to the eBSR transmission time. For example, as shown in FIG. 8, the UL time resolution may again be a symbol duration, but with a single UL packet being buffered in the LCG buffer. Thus, similar to the arrangement in FIG. 7, the UL time relative to eBSR transmission time may be configured for inclusion in the eBSR report, relative to the time of actual eBSR transmission.

In certain example embodiments, where medium access control (MAC) protocol data units (PDUs) are generated for a configured UL grant, NE 620 may have no indication that the MAC PDUs have been generated, and may not retransmit failed grants. Thus, the absolute time of the UL packets may be used instead of UL times relative to SFN and/or eBSR transmission time. Here, the eBSR configurations may trigger UE 630 to report the absolute time of the corresponding packet arrival per LCG buffer as the respective UL time stamp. However, this may require additional clock hardware to enable real-time tracking, and such reporting may increase necessary overhead.

In various example embodiments, higher-layer configuration RRC signalling from NE 620 to UE 630 (i.e., MAC-CellGroupConfig), such as the BSR-Config object illustrated in FIG. 3, could include several BSR configurations associated with BSR reporting periodicity and retransmission timers. Additionally or alternatively, the higher-layer configuration RRC signalling could include information element (IE) fields configured to indicate parameters associated with UL time-stamped BSR format reporting and triggering.

Figure 14:
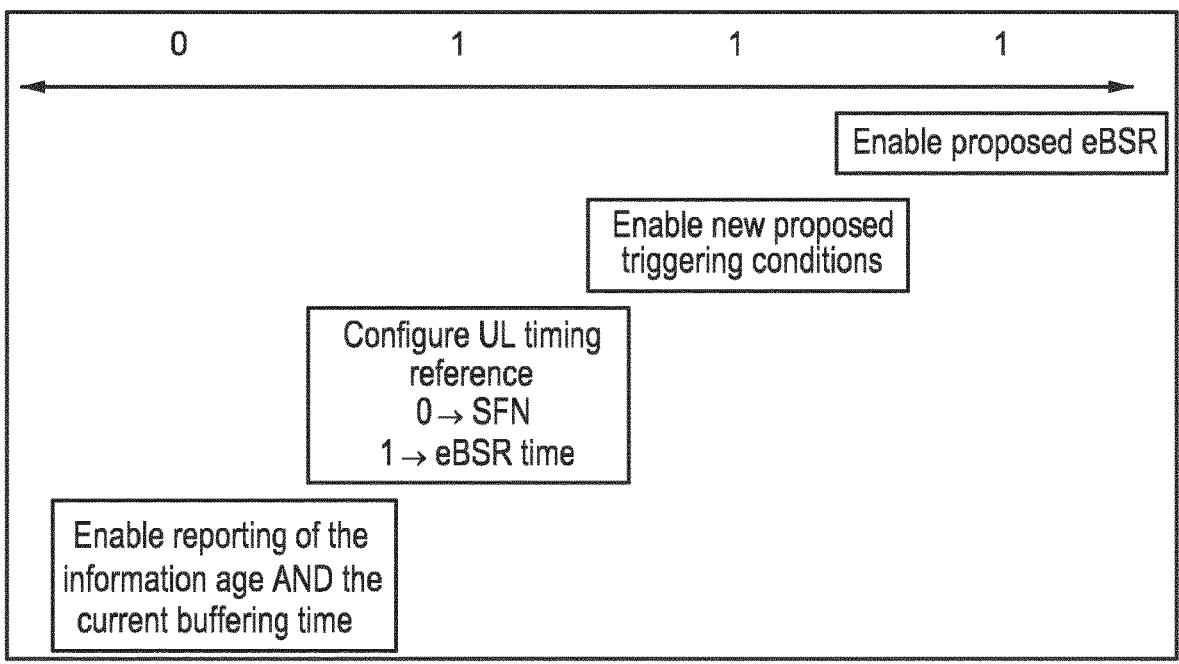
FIG. 14 illustrates an example of using a single multi-bit integer for baseline buffer status report configuration according to various example embodiments.

For example, eBSR configurations could include a 4-bit indication of configured options, with each bit denoting a particular setting. In one example scenario, a 4-bit integer could be defined and signaled from NE 620 to UE 630 in order to identify the desired eBSR format and/or reporting configurations. This is illustrated in FIG. 14, where an integer of '7=0111' indicates various configurations.

The following table illustrates an example embodiment of RRC signaling for configuring the eBSR using several of these indications.

| Information Element | Description |
| --- | --- |
| TimeStamped-BSR | a Boolean index to enable the new enhanced BSR formatting and reporting. If set to true, the UE may time stamp its UL packet arrivals according to a configured time-resolution, and it embeds the UL timing information within the reported BSR. For each LCG ID: if multiple packets are queued inside the same UL buffer, the new BSR format includes the UL timing information of the packet that has been buffered the longest. This is particularly relevant towards the URLLC latency-aware QoS handling, as the URLLC outage performance is typically dictated by the worst performing UEs/flows. |
| BSRTimeStamp-Resolution | an enumerated list of all possible time resolutions, which could be used at the UE side to time-stamp the UL packet arrivals, in case of reporting the relative UL timing information, to a configured time reference. It offers greater flexibility of capturing the UL timing information at the NE side, according to the desired QoS timing precision. For example, this list could include the time resolutions of a single OFDM symbol duration, a slot duration, N - slot duration, and/or a subframe duration. One non-limiting example of the configured time reference herein is the SFN, where it is a configured timing point among the NE and all its active UEs per cell. In another example embodiment, the configured time reference could be the time instant when the actual eBSR is transmitted from the UE to the serving NE. Accordingly, the final UL time-stamp in the proposed eBSR format is the number of time-resolution ticks, relative to the configured timing reference point, of the UL packet that is staying the longest in the buffer, as shown by the examples in FIG. 7 and 8. Herein, BSRTimeStamp-Resolution may be |

-continued

| Information Element | Description |
| --- | --- |
| | set to the symbol resolution. Thus, FIG. 7 illustrates the time reference point being the SFN, while FIG. 8 shows the situation when the eBSR transmission time is the reference point. |
| TimeStampedBSR-ForceWithULTx | if set to true, a new triggering condition may be incorporated by transmitting the new eBSR format with ongoing UL TB transmissions, regardless of the other standard triggering conditions. |
| ExtendedTimeStamped-BSR | this new IE may indicate a Boolean index; if set to true, it may enable reporting an extended UL-time stamped eBSR format, with dual UL time-stamps. Towards a further flexible and real-time UL QoS at the NE side, the NE may be aware of the current UL packet buffering performance (i.e., the latency status of the current UL buffers at the UE after current UL grant), which is already provided by the proposed baseline eBSR format, as well as the age information of the transmitted UL packets in current UL grants. The latter information is vital for the NE to tune its future UL grant procedure, UL resource allocation, etc., in order to further reduce the buffering delay of the future new UL packets |
| BSRTimeStamped-EnableDynStamp | a Boolean index to enable the dynamic format selection, as described in FIG. 12. When set to true, the UE may dynamically decide whether to include the UL timing information of current buffered packets or the age information of the currently transmitted UL packets, within the current UL transmission. This requires an additional 1-bit flag to inform the NE of the type of the adopted UL time stamp. This may require an additional 1-bit flag to inform the NE of the type of the adopted UL time stamp. |
| BSRTimeStamped-ForceAgeInfo | a Boolean index to enable reporting the age information only, as being shown by FIG. 11. |

At 605, UE 630 may receive at least one UL packet. At 607, UE 630 may record the arrival time of the at least one UL packet associated with the configured timing reference based on the received configuration resolution.

At 609, UE 630 may report an eBSR associated with at least one optional format for compressed signaling of UL timing information, such as usage of high layer preconfigured timing and/or latency tables. The eBSR may begin with the configuration shown in FIG. 5, where a single UL time stamp may be included in the eBSR report to represent the current packet buffering. This is further illustrated with the configured UL timing resolution and reference points shown in FIGS. 7 and 8. Throughout this disclosure, "age information" may refer to the time duration from the arrival time of the UL packet at the LCG buffer to the transmission time of the current UL grant. This period of time may allow NE 620 to identify how long the currently transmitted UL packets per UE per LCG have been waiting in the buffer, rather than only the UL timing information of the currently-buffered packets awaiting transmission by the UE side.

Figure 10:
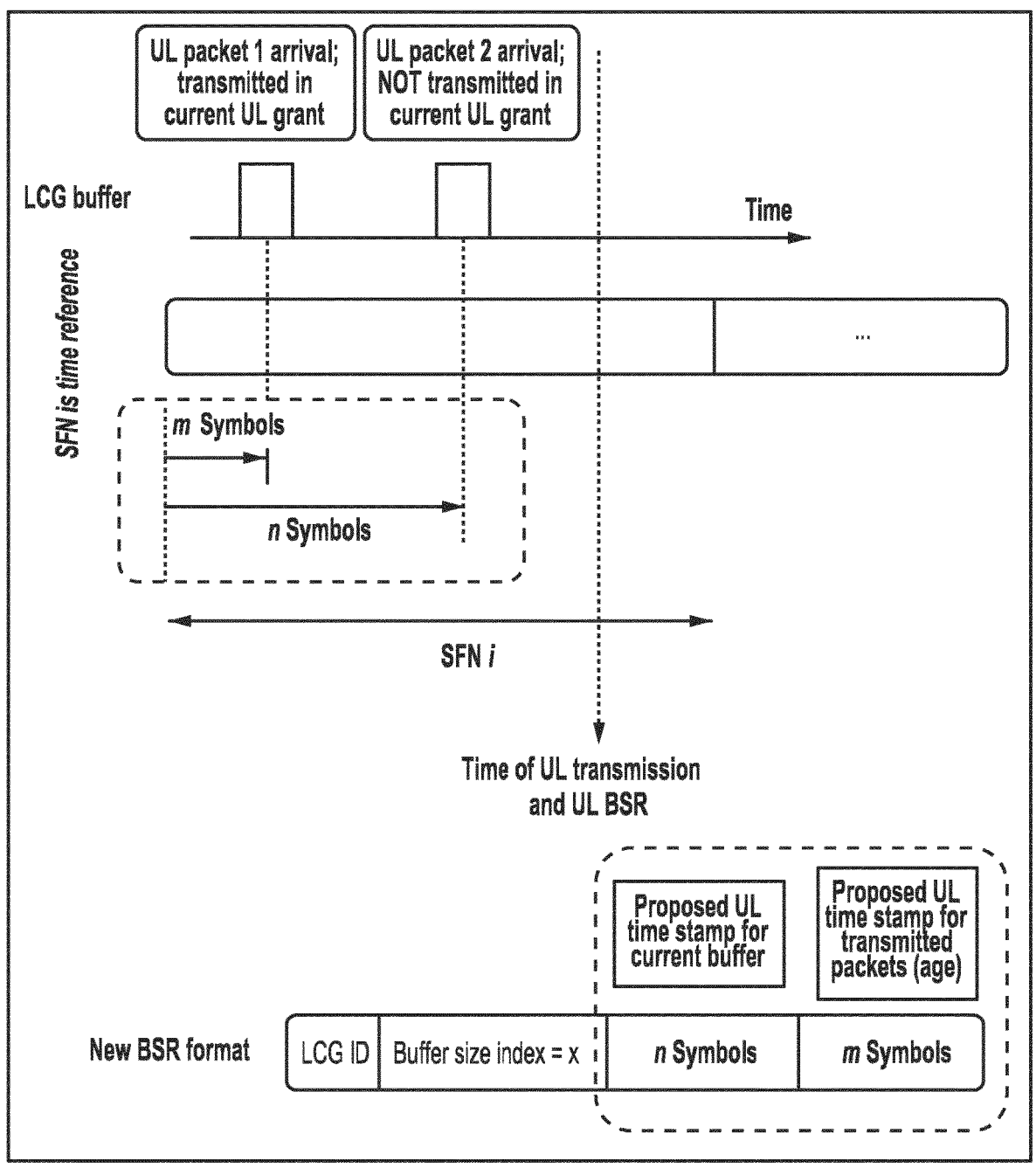
FIG. 10 illustrates an example of an extended uplink time-stamped buffer status report build including uplink age information according to certain example embodiments.

In various example embodiments, NE 620 may configure UE 630 to report dual UL time stamps, as shown by FIG. 9. For example, the first time stamp may indicate the longest buffering time of the remaining data in the L2 buffer (buffering time) of UE 630, while the second time stamp may indicate the buffering time of the data being transmitted in the same TB as the eBSR, which is illustrated in FIG. 10. This eBSR may indicate the buffering and/or UL timing age information, respectively.

In some example embodiments, UE 630 may have been configured by NE 620 to only report the age information UL timing information without reporting the time stamp corresponding with the current buffering performance per LCG, as depicted in FIG. 11. This may be advantageous for URLLC traffic with a very small payload size, where only reporting the age information is more useful while also dramatically reducing the signalling overhead of the new eBSR format, instead of always reporting a zero first UL time stamp to indicate that there are no further buffered UL packets per LCG.

In certain example embodiments, UE 630 may select which latency information to include with the eBSR report according to the configuration received from NE 620 at 603. For example, as shown in FIG. 12, UE 630 may autonomously select which time stamp to include in the eBSR, such as the buffering time and/or age information.

In various example embodiments, this could be indicated as a 1-bit flag, where a first flag, such as 0, may indicate the UL time stamp corresponds with the current buffering time of the LCG buffer, while a second flag, such as 1, may indicate that the UL time stamp corresponds with the age information. UE 630 may also be configured by NE 620 to determine which of the two latency metrics UE 630 should include in the eBSR. For example, UE 630 may simply include the latency metric with the highest value, or may include additional or alternative values based on the configuration received from NE 620.

Furthermore, in certain example embodiments, at least one overhead compression technique may be applied to the UL timing stamp information. For example, a pre-defined table with a non-uniform time resolution may be generated and configured to indicate the possible range of the UL timing information. In this way, UL time stamps in the eBSR may be indicated by at least one index from a pre-defined table, such as that shown in FIG. 13, where finer resolutions require more overhead. Thus, a non-uniformity may be applied to provide fine/tight resolution over a small buffering time range, and a wider resolution over a large buffering time range. Over a large buffering time range, a tighter or wider time variance would not be necessary.

Returning to the pre-defined time resolution table shown in FIG. 13, the UL timing resolution may be configured as a symbol duration, where system sub-carrier spacing is 30 KHz. Accordingly, over each SFN duration (i.e., 10 ms), there may be 280 orthogonal frequency division multiplexing (OFDM) symbol opportunities. Thus, in this example, the overhead of the proposed time index may be a single octet (i.e., 8 bits), and may be further minimized by changing the time resolution non-uniformity across the timing tables.

At 611, UE 630 may trigger reporting of at least one eBSR according to at least one triggering condition, which may be configured for continuous UL QoS real-time monitoring to NE 620. In various example embodiments, one or more triggering conditions may be satisfied in response to UL packets being received. In certain example embodiments, if triggering criteria are enabled, UE 630 could report the eBSR with each active UL transmission event. This could be performed as either a scheduled grant UL transmission and/or configured grant UL transmission, regardless of the active LCG priority and the eBSR reporting periodicity.

In various example embodiments, UE 630 may prepare a standard BSR with no UL timing information where the received eBSR configuration does not comprise a Time-Stamped-BSR information element (IE). After time stamping the received UL packets, UE 630 may prepare an eBSR with a single UL time stamp, which may be related to buffering, based upon BSRTimeStamp-Resolution being part of the received eBSR configuration. UE 630 may instead prepare an eBSR with a dynamically selected single UL time stamp, which may be based upon buffering and/or age information, where the received eBSR configuration includes BSRTimeStamped-EnableDynStamp. However, where the eBSR configuration received from NE 620 includes an BSRTimeStamped-ForceAgeInfo IE, UE 630 may instead prepare an eBSR having only a single UL timing stamp (age information) based on BSRTimeStamp-Resolution. Without the BSRTimeStamped-ForceAgeInfo IE, UE 630 may generate an eBSR with dual UL time stamps—buffering and age information—based upon BSR-TimeStamp-Resolution. Finally, UE 630 may determine whether the eBSR configuration received from NE 620 includes TimeStampedBSR-ForceWithULTx IE. This IE could trigger UE 630 to prepare the eBSR with each active UL transmission, while its absence may instead result in an eBSR generated in accordance with standard triggering conditions.

At 613, UE 630 may transmit the at least one eBSR to NE 620 based on the triggering conditions at 611, such as when an LCG ID per UE is active with continuous UL transmission. In some example embodiments, the at least one eBSR may be configured as shown in FIG. 15.

Figure 16:
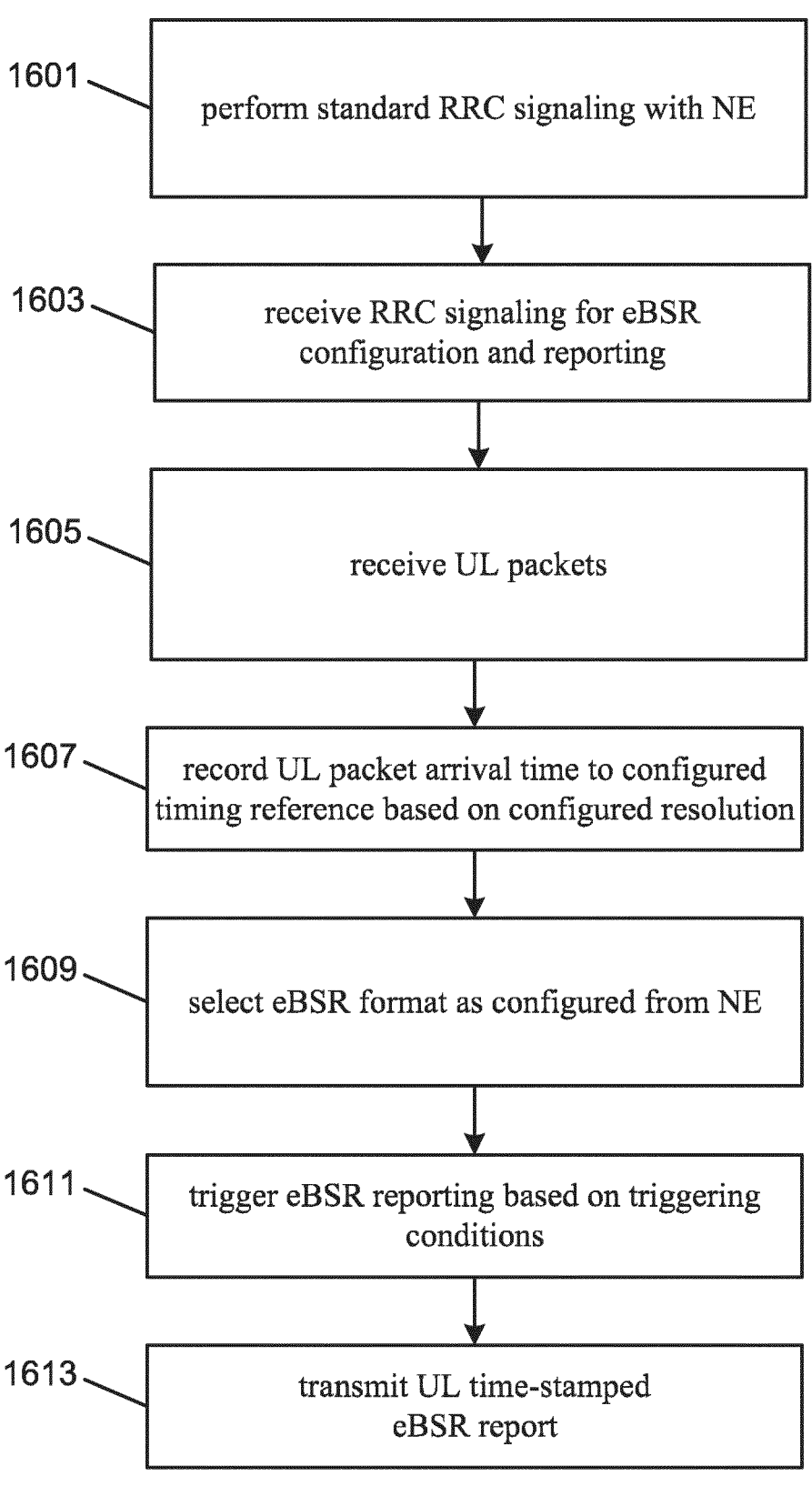
FIG. 16 illustrates an example of a flow diagram of a method according to various example embodiments.

FIG. 16 illustrates an example of a method performed by a UE, such as UE 1720 illustrated in FIG. 17, according to certain example embodiments. At 1601, the UE may communicate with an NE, such as NE 1710 illustrated in FIG. 17, via standard RRC signaling. At 1603, the UE may receive from the NE RRC signaling associated with eBSR configurations and/or eBSR reporting. In certain example embodiments, eBSR configurations may include UL timing information, such as UL timing references and UL timing resolutions, eBSR format selections, and/or eBSR triggering conditions.

For example, the eBSR configurations could include configurations for the UE to report absolute UL time. For UL packets that will be discussed later at 1605, absolute UL time configurations may be configured to cause the UE to report the absolute time of corresponding packet arrival times per LCG buffer as the UL time stamp. This absolute time indication could denote the exact clock time that the UL packet arrived.

In some example embodiments, the eBSR configurations may trigger the UE to report the arrival time of UL packets relative to a SFN. Using the configuration illustrated in FIG. 7, the UL time resolution configured by the NE may be a symbol duration relative to SFN boundaries. This UL time relative to SFN may be configured to cause the UE to embed a number of symbols when reporting the eBSR format, calculated from the start of the current SFN, over which the corresponding UL packet has been in the LCG buffer.

In various example embodiments, the eBSR configurations may cause the UE to report arrival time of UL packets relative to the eBSR transmission time. For example, as shown in FIG. 8, the UL time resolution may again be a symbol duration, but with a single UL packet being buffered in the LCG buffer. Thus, similar to the arrangement of FIG. 7, the UL time relative to eBSR transmission time may be configured for inclusion in the eBSR report relative to the time of actual eBSR transmission.

In certain example embodiments, where MAC PDUs are generated for a configured UL grant, the NE may have no indication that the MAC PDUs have been generated, and may not retransmit failed grants. Thus, the absolute time of the UL packets may be used rather than UL times relative to SFN and/or eBSR transmission time. Here, the eBSR configurations may trigger the UE to report the absolute time of the corresponding packet arrival per LCG buffer as the respective UL time stamp. However, this may require additional clock hardware to enable real-time tracking, and such reporting may increase necessary overhead.

In various example embodiments, with higher-layer configuration RRC signalling from the NE to the UE (i.e., MAC-CellGroupConfig), the BSR-Config object illustrated in FIG. 3 could include several BSR configurations associated with BSR reporting periodicity and retransmission timers. Additionally or alternatively, the higher-layer configuration RRC signalling could include IE fields configured to indicate parameters associated with UL time-stamped BSR format reporting and triggering.

For example, eBSR configurations could include a 4-bit field indicating configured options, with each bit indicating a particular setting. In one example scenario, a 4-bit integer could be defined and signaled from the NE to the UE in order to identify the desired eBSR format and/or reporting configurations. This is illustrated in FIG. 14, where an integer of '7=0111' indicates various configurations.

The following table illustrates an example embodiment of RRC signaling for configuring the eBSR.

| Information Element | Description |
|---|---|
| TimeStamped-BSR | a Boolean index to enable the new enhanced BSR formatting and reporting. If set to true, the UE time may stamp its UL packet arrivals according to a configured time-resolution, and it embeds the UL timing information within the reported BSR. For each LCG ID: if multiple packets are queued inside the same UL buffer, the new BSR format includes the UL timing information of the packet that has been buffered the longest. This is particularly relevant towards the URLLC latency-aware QoS handling, as the URLLC outage performance is typically dictated by the worst performing UEs/flows. |
| BSRTimeStamp-Resolution | an enumerated list of all possible time resolutions, which could be used at the UE side to time-stamp the UL packet arrivals, in case of reporting the relative UL timing information, to a configured time reference. It offers greater flexibility of capturing the UL timing information at the NE side, according to the desired QoS timing precision. For example, this list could include the time resolutions of a single OFDM symbol duration, a slot duration, N - slot duration, and/or a subframe duration. |

-continued

| Information Element | Description |
|---|---|
|  | One non-limiting example of the configured time reference herein is the SFN, where it is a configured timing point among the NE and all its active UEs per cell. In another example embodiment, the configured time reference could be the time instant when the actual eBSR is transmitted from the UE to the serving NE. Accordingly, the final UL time-stamp in the proposed eBSR format is the number of time-resolution ticks, relative to the configured timing reference point, of the UL packet that is staying the longest in the buffer, as shown by the examples in FIG. 7 and 8. Herein, BSRTimeStamp-Resolution may be set to the symbol resolution. Thus, FIG. 7 illustrates the time reference point being the SFN, while FIG. 8 shows the situation when the eBSR transmission time is the reference point. |
| TimeStampedBSR-ForceWithULTx | if set to true, a new triggering condition may be incorporated by transmitting the new eBSR format with ongoing UL TB transmissions, regardless of the other standard triggering conditions. |
| ExtendedTimeStamped-BSR | this new IE may indicate a Boolean index; if set to true, it may enable reporting an extended UL-time stamped eBSR format, with dual UL time-stamps. Towards a further flexible and real-time UL QoS at the NE side, the NE may be aware of the current UL packet buffering performance (i.e., the latency status of the current UL buffers at the UE after current UL grant), which is already provided by the proposed baseline eBSR format, as well as the age information of the transmitted UL packets in current UL grants. The latter information is vital for the NE to tune its future UL grant procedure, UL resource allocation, etc., in order to further reduce the buffering delay of the future new UL packets |
| BSRTimeStamped-EnableDynStamp | a Boolean index to enable the dynamic format selection, as described in FIG. 12. When set to true, the UE may dynamically decide whether to include the UL timing information of current buffered packets or the age information of the currently transmitted UL packets, within the current UL transmission. This requires an additional 1-bit flag to inform the NE of the type of the adopted UL time stamp. This may require an additional 1-bit flag to inform the NE of the type of the adopted UL time stamp. |
| BSRTimeStamped-ForceAgeInfo | a Boolean index to enable reporting the age information only, as being shown by FIG. 11. |

At 1605, the UE may receive at least one UL packet. At 1607, the UE may record the arrival time of the at least one UL packet associated with the configured timing reference based on the received configuration resolution.

At 1609, the UE may report an eBSR associated with at least one optional format for compressed signaling of UL timing information, such as usage of high layer preconfigured timing and/or latency tables. The eBSR may begin with the configuration shown in FIG. 5, where a single UL time stamp may be included in the eBSR report to represent the current packet buffering. This is further illustrated with the configured UL timing resolution and reference points shown in FIGS. 7 and 8. Throughout this disclosure, "age information" may refer to the time duration from the arrival time of the UL packet at the LCG buffer to the transmission time of the current UL grant. This period of time allows the NE to identify how long the currently transmitted UL packets per UE per LCG have been waiting in the buffer, rather than only the UL timing information of the currently-buffered packets awaiting transmission by the UE side.

In various example embodiments, the UE may be configured by the NE to report dual UL time stamps, as shown by FIG. 9. For example, the first time stamp may indicate the longest buffering time of the remaining data in the L2 buffer (buffering time) of UE, while the second time stamp may indicate the buffering time of the data being transmitted in the same TB as the eBSR, which is illustrated in FIG. 10. This eBSR may indicate the buffering and/or UL timing age information, respectively.

In some example embodiments, the UE may have been configured by the NE to only report the age information UL timing information without reporting the time stamp corresponding with the current buffering performance per LCG, as depicted in FIG. 11. This may be advantageous for URLLC traffic with a very small payload size, where only reporting the age information is more useful while also dramatically reducing the signalling overhead of the new eBSR format, instead of always reporting a zero first UL time stamp to indicate that there are no further buffered UL packets per LCG.

In certain example embodiments, the UE may select which latency information to include with the eBSR report according to the configuration received from the NE at 1603. For example, as shown in FIG. 12, the UE may autonomously select which time stamp to include in the eBSR, such as the buffering time and/or age information.

In one example embodiment, this could be indicated as a 1-bit flag, where a first flag, such as 0, may indicate the UL time stamp corresponds with the current buffering time of the LCG buffer, while a second flag, such as 1, may indicate that the UL time stamp corresponds with the age information. The UE may also be configured by the NE to determine which of the two latency metrics the UE should include in the eBSR. For example, the UE may simply include the latency metric with the highest value, or may include additional or alternative values based on the configuration received from the NE.

Furthermore, in certain example embodiments, at least one overhead compression technique may be applied to the UL timing stamp information. For example, a pre-defined table with a non-uniform time resolution may be generated and configured to indicate the possible range of the UL timing information. In this way, UL time stamps in the eBSR may be indicated by at least one index from a pre-defined table, such as that shown in FIG. 13, where finer resolutions require more overhead. Thus, a non-uniformity may be applied to provide fine/tight resolution over a small buffering time range, and a wider resolution over a large buffering time range. Over a large buffering time range, a tighter or wider time variance would not be necessary.

Returning to the pre-defined time resolution table shown in FIG. 13, the UL timing resolution may be configured as a symbol duration, where system sub-carrier spacing is 30 KHz. Accordingly, over each SFN duration (i.e., 10 ms), there may be 280 orthogonal frequency division multiplexing (OFDM) symbol opportunities. Thus, in this example, the overhead of the proposed time index may be a single octet (i.e., 8 bits), and may be further minimized by changing the time resolution non-uniformity across the timing tables.

At 1611, the UE may trigger reporting of at least one eBSR according to at least one triggering condition, which may be configured for continuous UL QoS real-time monitoring to the NE. In various example embodiments, one or more triggering conditions may be satisfied in response to UL packets being received. In certain example embodiments, if triggering criteria are enabled, the UE could report the eBSR with the event of each active UL transmission. This could be performed as either a scheduled grant UL transmission and/or configured grant UL transmission, regardless of the active LCG priority and the eBSR reporting periodicity.

In various example embodiments, the UE may prepare a standard BSR with no UL timing information where the received eBSR configuration does not comprise a Time-Stamped-BSR IE. After time stamping the received UL packets, the UE may prepare an eBSR with a single UL time stamp, which may be related to buffering, based upon BSRTimeStamp-Resolution being part of the received eBSR configuration. The UE may instead prepare an eBSR with a dynamically selected single IL time stamp, which may be based upon buffering and/or age information, where the received eBSR configuration includes BSRTimeStamped-EnableDynStamp. However, where the eBSR configuration received from the NE includes BSRTimeStamped-ForceAgeInfo IE, the UE may instead prepare an eBSR having only a single UL timing stamp (age information) based on BSRTimeStamp-Resolution. Without the BSR-TimeStamped-ForceAgeInfo IE, the UE may generate an eBSR with dual UL time stamps—buffering and age information—based upon BSRTimeStamp-Resolution. Finally, the UE may determine whether the eBSR configuration received from the NE includes TimeStampedBSR-Force-WithULTx IE. This IE could trigger the UE to prepare the eBSR with each active UL transmission, while its absence may instead result in an eBSR generated in accordance with standard triggering conditions.

At 1613, the UE may transmit the at least one eBSR to the NE based on the triggering conditions at 611, such as when an LCG ID per UE is active with continuous UL transmission. In some example embodiments, the at least one eBSR may be configured as shown in FIG. 15.

FIG. 17 illustrates an example of a system according to certain example embodiments. In one example embodiment, a system may include multiple devices, such as, for example, NE 1710 and/or UE 1720.

NE 1710 may be one or more of a base station, such as an eNB or gNB, a serving gateway, a server, and/or any other access node or combination thereof. Furthermore, NE 1710 and/or UE 1720 may be one or more of a citizens broadband radio service device (CBSD).

NE 1710 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

NE 1710 and/or UE 1720 may include at least one processor, respectively indicated as 1711 and 1721. Processors 1711 and 1721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1712 and 1722. The memory may be fixed or removable. The memory may include computer program instructions or computer code contained therein. Memories 1712 and 1722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1711 and 1721, memories 1712 and 1722, and any subset thereof, may be configured to provide means corresponding to the various blocks of FIGS. 1-16. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 17, transceivers 1713 and 1723 may be provided, and one or more devices may also include at least one antenna, respectively illustrated as 1714 and 1724. The device may have many antennas, such as an array of antennas configured for multiple input multiple output (MIMO) communications, or multiple antennas for multiple RATs. Other configurations of these devices, for example, may be provided. Transceivers 1713 and 1723 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-16). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-16. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 18:
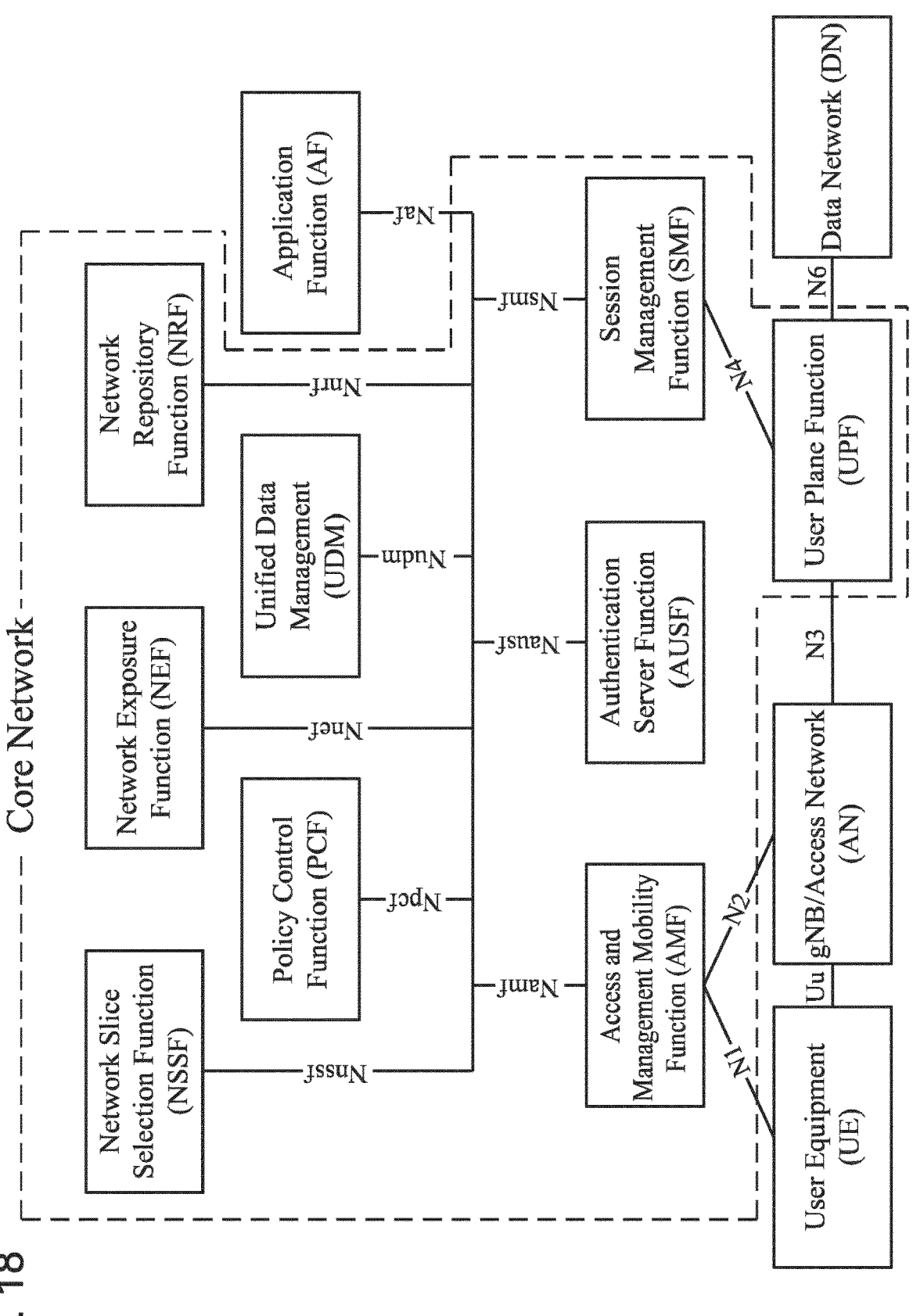
FIG. 18 illustrates an example of a 5G network and system architecture according to certain example embodiments.

FIG. 18 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 18 may be similar to NE 1710 and UE 1720, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various example embodiments," "certain example embodiments," "some example embodiments," or other similar language throughout this specification refers to the fact that a particular feature, structure, or characteristic described in connection with an example embodiment may be included in at least one example embodiment. Thus, appearances of the phrases "in various example embodiments," "in various example embodiments," "in certain example embodiments," "in some example embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some example embodiments have been described based upon these example embodiments, it would be apparent to those of skill in the art that certain modifications, variations, and alternative constructions would be apparent, while remaining within the spirit and scope of the example embodiments.

It will be readily understood that the components of certain example embodiments, as generally described and illustrated in the figures herein, may be arranged and designed in a wide variety of different configurations. Thus, the detailed description above of some example embodiments of systems, methods, apparatuses, and computer program products for providing a flexible technique of dynamically transferring the useful UL timing information from UEs to NEs with a minimal signalling overhead is not intended to limit the scope of certain example embodiments, but is instead representative of selected example embodiments.

Partial Glossary

3GPP Third Generation Partnership Project
5G Fifth Generation
5GC Fifth Generation Core
5GS Fifth Generation System
AMF Access and Mobility Management Function
ASIC Application Specific Integrated Circuit
BS Base Station
BSR Buffer Status Report
CBSD Citizens Broadband Radio Service Device
CG Configured Grant
CN Core Network
CPU Central Processing Unit
DL Downlink
eMBB Enhanced Mobile Broadband
eMTC Enhanced Machine Type Communication
eNB Evolved Node B
EPS Evolved Packet System
FDD Frequency Division Duplex
gNB Next Generation Node B
GPS Global Positioning System
HDD Hard Disk Drive
IE Information Element
IEEE Institute of Electrical and Electronics Engineers
IoT Internet of Things
L1 Layer 1
L2 Layer 2
LCH Logical Channel
LCP Logical Channel Prioritization
LTE Long-Term Evolution
LTE-A Long-Term Evolution Advanced
MAC Medium Access Control
MBB Mobile Broadband
MBS Multicast and Broadcast Systems
MEMS Micro Electrical Mechanical System
MIMO Multiple Input Multiple Output
MME Mobility Management Entity
mMTC Massive Machine Type Communication
MTC Machine Type Communication
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
OFDM Orthogonal Frequency Division Multiplexing
PDA Personal Digital Assistance
PDU Protocol Data Unit
QoS Quality of Service
RAM Random Access Memory
RAN Radio Access Network
RAT Radio Access Technology
RLC Radio Link Control
RRC Radio Resource Control
RS Reference Signal
SFN System Frame Number
SIB System Information Block
SMF Session Management Function
SRB Signaling Radio Bearer
TB Transport Block
TDD Time Division Duplex
TR Technical Report TS Technical Specification
TTI Transmission Time Interval
Tx Transmission
UE User Equipment
UL Uplink
UMTS Universal Mobile Telecommunications System
URLLC Ultra-Reliable and Low-Latency Communication
UTRAN Universal Mobile Telecommunications System Terrestrial Radio Access Network
WLAN Wireless Local Area Network According to a first example embodiment, a method may include receiving, by a user equipment, at least one buffer status report configuration from a network entity. The method may further include measuring, by the user equipment, at least one uplink packet arrival time according to the received at least one buffer status report configuration. The method may further include selecting, by the user equipment, at least one buffer status report format. The method may further include transmitting, by the user equipment, at least one uplink time-stamped buffer status report to the network entity according to the selected at least one buffer status report format.

In a variant, the method may further comprise triggering, by the user equipment, transmission of the uplink time-stamped buffer status report based on at least one triggering condition.

In a variant, the received buffer status report configuration may comprise an uplink packet timing information reporting configuration transmitted via higher-layer radio resource control signaling.

In a variant, the uplink packet timing information reporting configuration may comprise one or more of at least one uplink time resolution symbol duration information element relative to system frame number boundaries and at least one timing resolution information element associated with requested uplink timing information precision.

In a variant, the uplink time-stamped buffer status report may comprise one or more of relative timing information associated with a logical channel group associated with packet buffering time and/or age information and an indication of deterministic rules used by the user equipment to dynamically determine uplink timing information in the uplink time-stamped buffer status report.

In a variant, the selected buffer status report format may comprise one or more of fixed format selection and dynamic format selection.

According to a second example embodiment, a method may include communicating, by a network entity, with at least one user equipment via radio resource control signaling. The method may further include transmitting, by the network entity, at least one buffer status report configuration to the at least one user equipment. The method may further include receiving, by the network entity, at least one uplink time-stamped buffer status report from the at least one user equipment.

In a variant, the transmitted buffer status report configuration may comprise an uplink packet timing information reporting configuration transmitted via higher-layer radio resource control signaling In a variant, the uplink packet timing information reporting configuration may comprise one or more of at least one uplink time resolution symbol duration information element relative to system frame number boundaries and at least one timing resolution information element associated with requested uplink timing information precision.

In a variant, the uplink time-stamped buffer status report comprises one or more of relative timing information associated with a logical channel group associated with packet buffering time and/or age information and an indication of deterministic rules used by the user equipment to dynamically determine uplink timing information in the uplink time-stamped buffer status report.

In a variant, the selected buffer status report format may comprise one or more of fixed format selection and dynamic format selection.

In a variant, the at least one uplink packet timing information reporting configuration may be transmitted via higher-layer radio resource control signaling.

According to a third example embodiment and a fourth example embodiment, an apparatus may include at least one processor and at least one memory including computer program code. The at least one memory and the computer program code may be configured to, with the at least one processor, cause the apparatus at least to perform a method according to the first example embodiment, the second example embodiment, and any of their variants.

According to a fifth example embodiment and a sixth example embodiment, an apparatus may include means for performing the method according to the first example embodiment, the second example embodiment, and any of their variants.

According to a seventh example embodiment and an eighth example embodiment, a computer program product may be encoded with instructions for performing a process including a method according to the first example embodiment, the second example embodiment, and any of their variants.

According to a ninth example embodiment and a tenth example embodiment, a non-transitory, computer-readable medium may have instructions stored thereon that, when executed in hardware, perform a process including a method according to the first example embodiment, the second example embodiment, and any of their variants.

According to an eleventh example embodiment and a twelfth example embodiment, computer program code may include instructions for performing a method according to the first example embodiment, the second example embodiment, and any of their variants.

According to a thirteenth example embodiment and a fourteenth example embodiment, an apparatus may include circuitry configured to perform a process including a method according to the first example embodiment, the second example embodiment, and any of their variants.

We claim:

1. An apparatus, comprising:
at least one processor; and
at least one non-transitory memory storing instructions that, when executed with the at least one processor, cause the apparatus at least to:
receive at least one buffer status report configuration from a network entity;
measure at least one uplink packet arrival time according to the received at least one buffer status report configuration;
select at least one buffer status report format; and
transmit at least one uplink time-stamped buffer status report to the network entity according to the selected at least one buffer status report format,
wherein the instructions, when executed with the at least one processor, cause the apparatus at least to:
trigger transmission of the uplink time-stamped buffer status report based on at least one triggering condition, wherein the received buffer status report configuration comprises an uplink packet timing information reporting configuration transmitted via higher-layer radio resource control signaling, wherein the uplink packet timing information reporting configuration comprises:

at least one uplink time resolution symbol duration information element relative to system frame number boundaries; and at least one timing resolution information element associated with requested uplink timing information precision, wherein the uplink time-stamped buffer status report comprises:

relative timing information associated with a logical channel group associated with packet buffering time and age information; and an indication of deterministic rules used by the user equipment to dynamically determine uplink timing information in the uplink time-stamped buffer status report, wherein the selected buffer status report format comprises fixed format selection and dynamic format selection.

2. The apparatus of claim 1, wherein the instructions, when executed with the at least one processor, cause the apparatus at least to:

report dual uplink time stamps, wherein a first time stamp indicates the longest buffering time of the remaining data in a Layer 2 buffer of the apparatus, and wherein a second time stamp indicates a buffering time of the data being transmitted in the same transport block as the buffer status report, indicates the buffering and uplink timing age information.

3. The apparatus of claim 1, wherein the buffer status report configurations include configurations for the apparatus to report absolute uplink time, wherein absolute uplink time configurations are configured to cause the apparatus to report the absolute time of corresponding packet arrival times per logical channel group buffer as the uplink time stamp, wherein the absolute time indication denotes the exact clock time that the uplink packet arrived.

4. The apparatus of claim 3, wherein the apparatus is further caused to only report the age information uplink timing information without reporting the time stamp corresponding with the current buffering performance per logical channel group.

5. The apparatus of claim 1, wherein the apparatus is further caused to select which latency information to include with the buffer status report according to the configuration received from the network entity, wherein the apparatus autonomously selects which time stamp to include in the eBSR, such as the buffering time and/or age information.

6. The apparatus of claim 1, wherein at least one overhead compression technique is applied to the uplink timing stamp information, wherein a pre-defined table with a non-uniform time resolution is generated and configured to indicate the possible range of the uplink timing information, wherein uplink time stamps in the buffer status report is indicated by at least one index from a pre-defined table and wherein the uplink timing resolution is configured as a symbol duration, where system sub-carrier spacing is 30 KHz.

7. An apparatus, comprising:

at least one processor; and at least one non-transitory memory including computer program code, wherein the instructions, when executed with the at least one processor, cause the apparatus at least to:

communicate with at least one user equipment via radio resource control signaling;

transmit at least one buffer status report configuration to the at least one user equipment; and receive at least one uplink time-stamped buffer status report from the at least one user equipment, wherein the uplink packet timing information reporting configuration comprises:

at least one uplink time resolution symbol duration information element relative to system frame number boundaries; and at least one timing resolution information element associated with requested uplink timing information precision, wherein the uplink time-stamped buffer status report comprises:

relative timing information associated with a logical channel group associated with packet buffering time and age information; and an indication of deterministic rules used by the user equipment to dynamically determine uplink timing information in the uplink time-stamped buffer status report, wherein the selected buffer status report format comprises fixed format selection and dynamic format selection.

8. The apparatus of claim 7, wherein the transmitted buffer status report configuration comprises an uplink packet timing information reporting configuration transmitted via higher-layer radio resource control signaling.

9. The apparatus of claim 7, wherein the at least one uplink packet timing information reporting configuration is transmitted via higher-layer radio resource control signaling.

10. A method, comprising:

receiving, with a user equipment, at least one buffer status report configuration from a network entity;

measuring, by the user equipment, at least one uplink packet arrival time according to the received at least one buffer status report configuration;

selecting, by the user equipment, at least one buffer status report format; and transmitting, by the user equipment, at least one uplink time-stamped buffer status report to the network entity according to the selected at least one buffer status report format, wherein the method further comprises:

triggering transmission of the uplink time-stamped buffer status report based on at least one triggering condition, wherein the received buffer status report configuration comprises an uplink packet timing information reporting configuration transmitted via higher-layer radio resource control signaling, wherein the uplink packet timing information reporting configuration comprises:

at least one uplink time resolution symbol duration information element relative to system frame number boundaries; and at least one timing resolution information element associated with requested uplink timing information precision, wherein the uplink time-stamped buffer status report comprises:

relative timing information associated with a logical channel group associated with packet buffering time and age information; and an indication of deterministic rules used by the user equipment to dynamically determine uplink timing information in the uplink time-stamped buffer status report, wherein the selected buffer status report format comprises fixed format selection and dynamic format selection.

11. The method of claim 10, further comprising: triggering, by the user equipment, transmission of the uplink time-stamped buffer status report based on at least one triggering condition.

12. The method of claim 10, wherein the received buffer status report configuration comprises an uplink packet timing information reporting configuration transmitted via higher-layer radio resource control signaling.

13. A method, comprising:

communicating, by a network entity, with at least one user equipment via radio resource control signaling;

transmitting, by the network entity, at least one buffer status report configuration to the at least one user equipment; and receiving, by the network entity, at least one uplink time-stamped buffer status report from the at least one user equipment, wherein the uplink packet timing information reporting configuration comprises:

at least one uplink time resolution symbol duration information element relative to system frame number boundaries; and at least one timing resolution information element associated with requested uplink timing information precision, wherein the uplink time-stamped buffer status report comprises:

relative timing information associated with a logical channel group associated with packet buffering time and age information; and an indication of deterministic rules used by the user equipment to dynamically determine uplink timing information in the uplink time-stamped buffer status report, wherein the selected buffer status report format comprises fixed format selection and dynamic format selection.

14. The method of claim 13, wherein the transmitted buffer status report configuration comprises an uplink packet timing information reporting configuration transmitted via higher-layer radio resource control signaling.

* * * * *